(12) United States Patent
Tateishi

(10) Patent No.: US 10,301,694 B2
(45) Date of Patent: May 28, 2019

(54) HEAT TREATMENT METHOD FOR STEEL MATERIAL

(71) Applicant: TOYOTA JIDOSHA KABUSHIKI KAISHA, Toyota-shi (JP)

(72) Inventor: Hiroki Tateishi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 685 days.

(21) Appl. No.: 14/988,790

(22) Filed: Jan. 6, 2016

(65) Prior Publication Data

US 2016/0208354 A1 Jul. 21, 2016

(30) Foreign Application Priority Data

Jan. 15, 2015 (JP) ................................. 2015-005564

(51) Int. Cl.
*C21D 1/09* (2006.01)
*C21D 1/10* (2006.01)
(Continued)

(52) U.S. Cl.
CPC ............... *C21D 6/00* (2013.01); *C21D 1/09* (2013.01); *C21D 1/10* (2013.01); *C21D 1/18* (2013.01);
(Continued)

(58) Field of Classification Search
CPC ... C21D 6/00; C21D 1/09; C21D 1/10; C21D 1/18; C21D 1/42; C21D 1/60; C21D 1/34;
(Continued)

(56) References Cited

U.S. PATENT DOCUMENTS

| 4,033,789 A * | 7/1977 | Hamburg ............. C21D 8/0226 |
| | | 148/337 |
| 6,140,605 A * | 10/2000 | Stengel .................... B21D 5/04 |
| | | 219/121.74 |
| 2015/0218688 A1* | 8/2015 | Larsson .................... C23C 8/80 |
| | | 148/233 |

FOREIGN PATENT DOCUMENTS

| JP | 64-28322 | 1/1989 |
| JP | 2-258916 A | 10/1990 |

(Continued)

OTHER PUBLICATIONS

Kennedy, E., et al. "A Review of the Use of High Power Diode Lasers in Surface Hardening." Journal of Materials Processing Technology, vol. 155-156, 2004, pp. 1855-1860., doi:10.1016/j.jmatprotec.2004.04.276. (Year: 2004).*

(Continued)

*Primary Examiner* — Kevin E Yoon
*Assistant Examiner* — Ryan L Heckman
(74) *Attorney, Agent, or Firm* — Oblon, McClelland, Maier & Neustadt, L.L.P.

(57) ABSTRACT

A heat treatment method for a steel material according to the present invention includes: a first step of forming austenite by heating the steel material to a temperature equal to or higher than an A1 point; a second step of cooling the steel material heated in the first step, while keeping the steel material at a temperature higher than an Ms point, thereby causing the austenite of the steel material to be transformed into ferrite, pearlite, or bainite; and a third step of cooling the steel material to a temperature equal to or lower than the Ms point after the second step. According to the present invention, it is possible to provide a heat treatment method for a steel material which is capable of shortening a heat treatment time while suppressing the formation of martensite.

4 Claims, 9 Drawing Sheets

(51) Int. Cl.
- *C21D 1/18* (2006.01)
- *C21D 1/34* (2006.01)
- *C21D 1/42* (2006.01)
- *C21D 1/60* (2006.01)
- *C21D 6/00* (2006.01)

(52) U.S. Cl.
CPC ............... *C21D 1/42* (2013.01); *C21D 1/60* (2013.01); *C21D 1/34* (2013.01); *C21D 2211/002* (2013.01); *C21D 2211/005* (2013.01); *C21D 2211/009* (2013.01); *Y02P 10/253* (2015.11)

(58) Field of Classification Search
CPC ........ C21D 2211/002; C21D 2211/005; C21D 2211/009; Y02P 10/253
See application file for complete search history.

(56) References Cited

FOREIGN PATENT DOCUMENTS

| | | |
|---|---|---|
| JP | 3-219010 A | 9/1991 |
| JP | 4-52218 A | 2/1992 |
| JP | 6-108144 | 4/1994 |
| JP | 9-241732 A | 9/1997 |
| JP | 9-268316 | 10/1997 |
| JP | 2001-323319 | 11/2001 |
| KR | 100508784 B1 * | 10/2005 |
| WO | WO 2013/146214 A1 | 10/2013 |

OTHER PUBLICATIONS

Machine Translation of KR-100508784 (Year: 2005).*
Brown, Matthew S., and Craig B. Arnold. "Fundamentals of Laser-Material Interaction and Application to Multiscale Surface Modification." Laser Precision Microfabrication Springer Series in Materials Science, 2010, pp. 91-120 (Year: 2010).*
Katsu Gin, et al., "Machinery Manufacturing Basics" Machine Press, Jul. 31, 2014, p. 56 (with partial English translation).
Nobuhiro Murai et al., "Effects of Alloying Elements and Carbon Potential on the Amount of Retained Austenite of Carburized Steel." vol. 84 (1998) No. 6, 6 pages.

* cited by examiner

HEAT TREATMENT METHOD FOR STEEL MATERIAL

INCORPORATION BY REFERENCE

This application is based upon and claims the benefit of priority from Japanese patent application No. 2015-005564, filed on Jan. 15, 2015, the disclosure of which is incorporated herein in its entirety by reference.

BACKGROUND OF THE INVENTION

1. Field of the Invention

The present invention relates to a heat treatment method for a steel material.

2. Description of Related Art

In general, in order to produce a steel material having a predetermined hardness, the hardness of the steel material is increased by performing a quenching treatment on the steel material, and after that, the hardness of the steel material is adjusted by performing a tempering treatment on the steel material. Japanese Unexamined Patent Application Publication No. H06-108144 discloses a technique relating to a heat treatment method for a steel material which is capable of keeping the hardness of a steel material after tempering, while shortening a heat treatment time for tempering, and preventing formation of a martensitic structure during cooling.

SUMMARY OF THE INVENTION

When the temperature conditions in which the heat treatment (tempering treatment) is performed on the steel material are inadequate, martensite that causes a delayed fracture is formed. The martensite is formed when austenite which is formed during heating of the steel material to a temperature equal to or higher than an A1 point (A1 transformation temperature) is cooled. Accordingly, in the case of performing a heat treatment on a steel material as shown in FIG. 9, the heat treatment is performed at a temperature lower than the A1 point (the temperature at which austenite is formed). By performing the heat treatment at a temperature lower than the A1 point, the formation of austenite can be suppressed. As a result, the formation of martensite during cooling can be suppressed.

At this time, it is necessary to increase the heat treatment temperature as high as possible in order to shorten the heat treatment time, so that the temperature difference between the heat treatment temperature and the A1 point tends to decrease (see "$\Delta T$" in FIG. 9). For this reason, if there is an error in measuring the temperature of the steel material during the heat treatment, the steel material is unintentionally heated to a temperature equal to or higher than the A1 point, so that austenite is formed. As a result, the austenite which is unintentionally formed is cooled in the cooling step, which causes a problem that martensite that causes a delayed fracture is formed.

An object of the present invention is to provide a heat treatment method for a steel material that is capable of shortening a heat treatment time while suppressing the formation of martensite.

A first exemplary aspect of the present invention is a heat treatment method for a steel material, including: a first step of forming austenite by heating the steel material to a temperature equal to or higher than an A1 point; a second step of cooling the steel material heated in the first step, while keeping the steel material at a temperature higher than an Ms point, thereby causing the austenite of the steel material to be transformed into ferrite, pearlite, or bainite; and a third step of cooling the steel material to a temperature equal to or lower than the Ms point after the second step.

In the heat treatment method according to the first exemplary aspect of the present invention, austenite is formed by heating the steel material to a temperature equal to or higher than the A1 point in the first step. In the second step, austenite that causes the formation of martensite is transformed into ferrite, pearlite, or bainite. Thus, the formation of martensite when the steel material is cooled in the third step can be suppressed. Further, by allowing the formation of austenite in the first step, the steel material can be heated to a temperature equal to or higher than the A1 point and the heat treatment temperature can be increased. This leads to shortening of a heat treatment time.

According to the present invention, it is possible to provide a heat treatment method for a steel material which is capable of shortening the heat treatment time while suppressing the formation of martensite.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Exemplary embodiments of the present invention will be described below with reference to the drawings.

Figure 1:
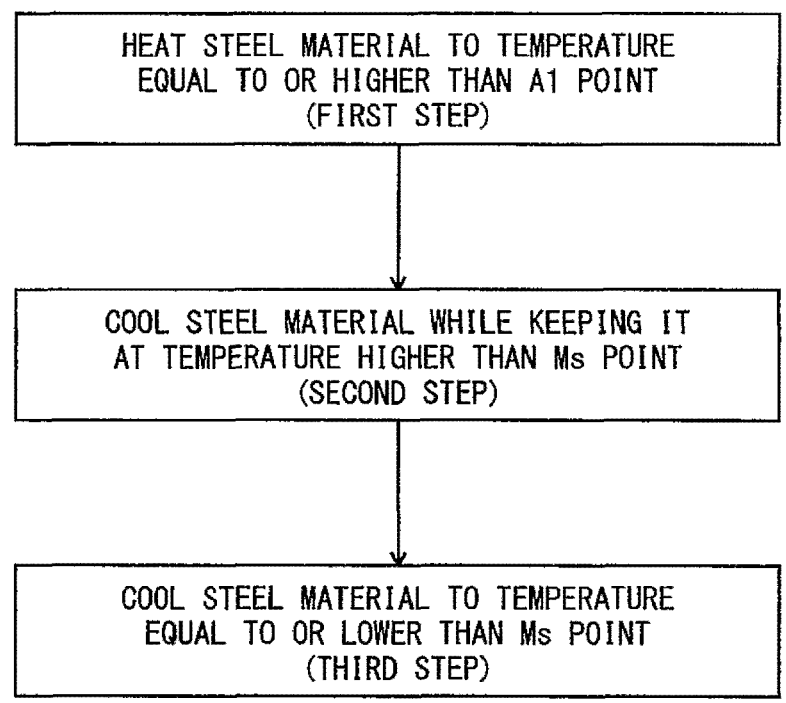
FIG. 1 is a flowchart for explaining a heat treatment method for a steel material according to an exemplary embodiment.
Figure 2:
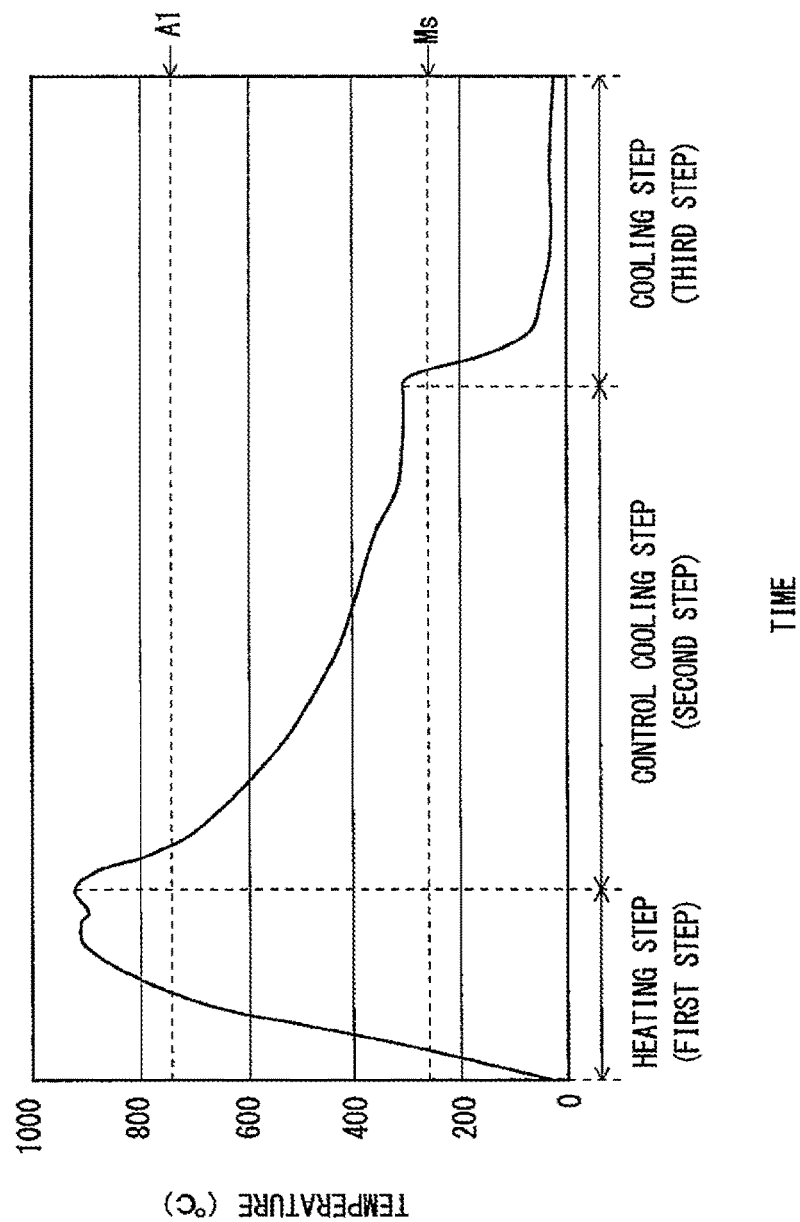
FIG. 2 is a graph showing an example of a temperature profile in the heat treatment method for a steel material according to the exemplary embodiment.

FIG. 1 is a flowchart for explaining a heat treatment method for a steel material according to an exemplary embodiment. FIG. 2 is a graph showing an example of a temperature profile in the heat treatment method for a steel material according to the exemplary embodiment. The heat treatment method for a steel material according to this exemplary embodiment can be carried out to, for example, adjust (lower) the hardness of the steel material on which a quenching treatment is performed.

The heat treatment method according to this exemplary embodiment can be applied to iron containing carbon, that is, a steel material. In this case, the concentration (mass %) of carbon contained in the steel material is equal to or less than 2%. The steel material may contain elements other than carbon, such as Si, Mn, P, S, Cr, Ni, and Cu. For example, a steel material with a carbon content of 0.25% or less is also referred to as a low-carbon steel; a steel material with a carbon content of 0.25% to 0.6% is also referred to as a medium-carbon steel; and a steel material with a carbon content of 0.6% or more is also referred to as a high-carbon steel.

Figure 3:
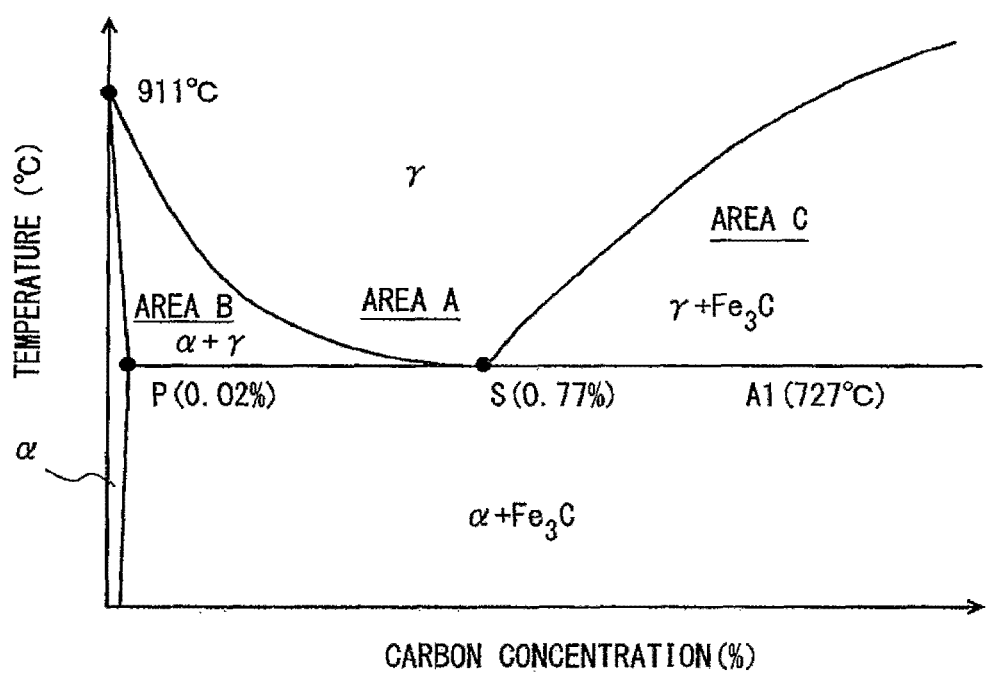
FIG. 3 is an example of a phase diagram of a steel material.

FIG. 3 shows a phase diagram of a Fe—C system as an example of a phase diagram of the steel material. In the phase diagram of FIG. 3, α represents ferrite; γ represents austenite; $Fe_3C$ represents cementite; A1 point represents an austenite transformation point (727° C.); and S represents the eutectoid transformation composition of austenite (eutectoid point: 0.77%).

In the heat treatment method according to this exemplary embodiment, as shown in FIGS. 1 and 2, first, austenite is formed by heating the steel material to a temperature equal to or higher than the A1 point (a heating step: a first step). Specifically, as shown in the phase diagram of FIG. 3, austenite (γ) can be formed by heating the steel material to a temperature equal to or higher than the A1 point. In this case, depending on the carbon concentration of the steel material, the area of the steel material can be divided as follows: an area (area A) containing only austenite (γ) is included; an area (area B) containing ferrite (α) and austenite (γ); and an area (area C) containing austenite (γ) and cementite ($Fe_3C$). For example, in the cases of low-carbon steel and medium-carbon steel (for example, with a carbon concentration of 0.2% to 0.6%), which are generally widely used, the area (area A) containing only austenite can be formed by heating the steel material to a temperature of about 920° C.

Note that in the heat treatment method according to this exemplary embodiment, in the case of forming austenite in the first step, ferrite (α) or cementite ($Fe_3C$), as well as austenite, may be contained in the steel material. The temperature (727° C.) of the A1 point mentioned above is only an example, and the temperature of the A1 point may vary depending on the composition and the like of the steel material.

Next, as shown in FIGS. 1 and 2, the steel material heated in the first step is cooled while the steel material is kept at a temperature higher than an Ms point (a control cooling step: a second step). The term "Ms point" used herein refers to a temperature at which austenite is transformed into martensite. When austenite is cooled to a temperature equal to or lower than the Ms point, martensite is formed. When the steel material in which austenite is formed is cooled in the heat treatment method according to this exemplary embodiment, the steel material is slowly cooled while the steel material is kept at a temperature higher than the Ms point, thereby allowing austenite to be transformed into a structure other than martensite.

Specifically, in the second step, the steel material is cooled while the steel material is kept at a temperature higher than the Ms point, thereby allowing austenite in the steel material to be transformed into ferrite, pearlite, or bainite. Pearlite is a laminated structure formed by the eutectoid transformation of austenite into ferrite and cementite. Bainite is a structure containing ferrite and cementite, and is formed by the isothermal transformation of austenite in an area of the steel material with a temperature which is lower than the pearlite formation temperature and higher than the Ms point.

In the phase diagram of FIG. 3, at a temperature lower than the A1 point, ferrite (α) and cementite ($Fe_3C$) exist. When austenite contained in the steel material is cooled in the second step, the austenite is transformed into ferrite, pearlite, or bainite depending on the carbon concentration in the steel material. In this case, each of pearlite and bainite is a structure containing ferrite and cementite. For example, in the case of a steel material with a carbon concentration of 0.77%, when the steel material is cooled in the second step, the entire surface of the structure transforms from austenite to pearlite (eutectoid steel). In the case of a steel material with a carbon concentration lower than 0.77%, when the steel material is cooled in the second step, a part of the austenite is transformed into ferrite, and another part of the austenite is transformed into pearlite. In other words, the austenite contained in the steel material is transformed into ferrite or pearlite (in this case, ferrite and pearlite coexist in the steel material). When the cooling rate in the second step is high, bainite is formed instead of pearlite. When the cooling rate is extremely high, martensite is formed.

Martensite is a solid solution in which carbon is trapped in a crystal of iron having a body-centered tetragonal lattice, and is hard and fragile. Martensite has a property that the hardness thereof increases as the carbon concentration increases. In addition, as described above, martensite causes a delayed fracture of a steel material.

The temperature of the Ms point at which austenite is transformed into martensite varies depending on the carbon concentration in the steel material. That is, the Ms point tends to decrease as the carbon concentration in the steel material increases. The Ms point can be obtained by the following formula (see "Effects of Alloying Elements and Carbon Potential on the Amount of Retained Austenite of Carburized Steel", Murai and Tsumura, Iron and Steel, Vol. 84 (1998) No. 6, pp. 446-451).

$$Ms(K)=812-423C-30.4Mn-17.7Ni-12.1Cr-7.5Mo\pm(10Co-7.5Si) \quad \text{Formula 1}$$

where C represents mass % of C; Mn represents mass % of Mn; Ni represents mass % of Ni; Cr represents mass % of Cr; Mo represents mass % of Mo; Co represents mass % of Co; and Si represents mass % of Si. For example, the Ms point of the steel material containing 0.2% of carbon, 0.25% of Si, 0.73% of Mn, 1.05% of Cr, and 0.13% of Ni is 415.4° C. The Ms point of the steel material containing 0.6% of carbon, 0.25% of Si, 0.73% of Mn, 1.05% of Cr, and 0.13% of Ni is 246.2° C. Thus, the Ms point tends to decrease as the carbon concentration in the steel material increases. Specifically, when the carbon concentration is 0.2%, the Ms point is 415.4° C., and when the carbon concentration is 0.6%, the Ms point is 246.2° C.

As shown in FIGS. 1 and 2, after the second step, the steel material is cooled to a temperature equal to or lower than the Ms point (a cooling step: a third step). After the second step, austenite that causes the formation of martensite has already transformed into ferrite, pearlite, or bainite. Thus, martensite is not formed even when the steel material is cooled to a temperature equal to or lower than the Ms point. In the third step, in the case of cooling the steel material to a temperature equal to or lower than the Ms point, the steel material may be cooled (quenched) by water cooling. The use of water cooling leads to an increase in the cooling rate and an improvement in the productivity of the heat treatment process.

Figure 9:
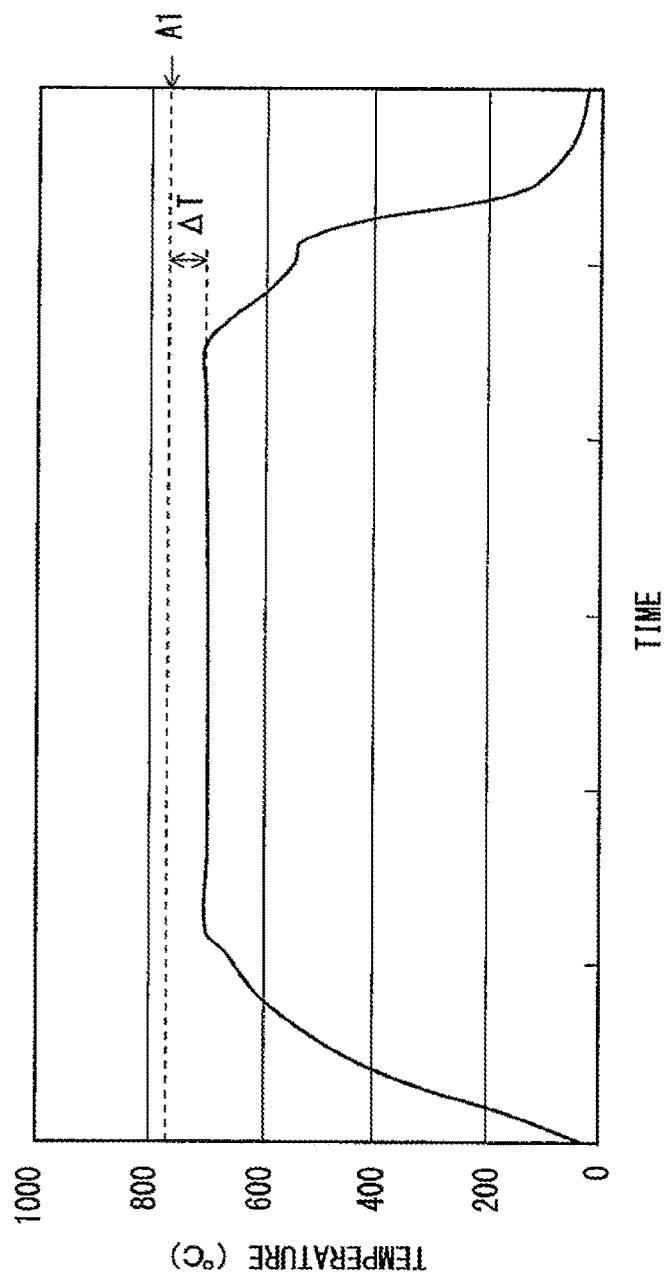
FIG. 9 is a graph for explaining a problem to be solved by the present invention.

As described in the "SUMMARY OF THE INVENTION" section, in the case of performing a heat treatment on a steel material, the heat treatment may be performed at a temperature at which austenite is not formed (at a temperature lower than the A1 point) as shown in FIG. 9. At this time, it is necessary to increase the heat treatment temperature as high as possible in order to shorten the heat treatment time, so that the temperature difference between the heat treatment temperature and the A1 point tends to decrease (see "αT" in FIG. 9). For this reason, if there is an error in measuring the temperature of the steel material during the heat treatment, the steel material is unintentionally heated to a temperature equal to or higher than the A1 point, so that austenite is formed.

For example, when the temperature of the steel material is measured by a radiation thermometer, the lens of the radiation thermometer may be contaminated with moisture or lamp black generated during the heat treatment, with the result that the temperature of the radiation thermometer may become lower than the actual temperature. Accordingly, if a heat treatment device is controlled based on the temperature lower than the actual temperature, the steel material is heated to a temperature equal to or higher than the A1 point.

For this reason, when the temperature difference between the heat treatment temperature and the A1 point is small, the steel material is unintentionally heated to a temperature equal to or higher than the A1 point, so that austenite is formed. As a result, the austenite which is unintentionally formed is cooled in the cooling step, which causes a problem that martensite that causes a delayed fracture is formed.

In the heat treatment method according to this exemplary embodiment, austenite is formed by heating the steel material to a temperature equal to or higher than the A1 point (first step); the heated steel material is cooled, while the steel material is kept at a temperature higher than the Ms point, thereby causing the austenite of the steel material to be transformed into ferrite, pearlite, or bainite (second step); and the steel material is cooled to a temperature equal to or lower than the Ms point (third step). Accordingly, in the heat treatment method according to this exemplary embodiment, austenite that causes the formation of martensite is transformed into ferrite, pearlite, or bainite in the second step. Thus, the formation of martensite when the steel material is cooled in the third step can be suppressed. Further, the steel material can be heated to a temperature equal to or higher than the A1 point by allowing the formation of austenite in the first step, so that the heat treatment temperature can be increased. Consequently, the heat treatment time can be shortened. Therefore, according to the heat treatment method of this exemplary embodiment, it is possible to provide a heat treatment method for a steel material which is capable of shortening the heat treatment time, while suppressing the formation of martensite. Moreover, in the heat treatment method according to this exemplary embodiment, since the steel material can be heated to a temperature equal to or higher than the A1 point, the temperature control range during the heat treatment can be increased and the quality stability can be improved.

Figure 4:
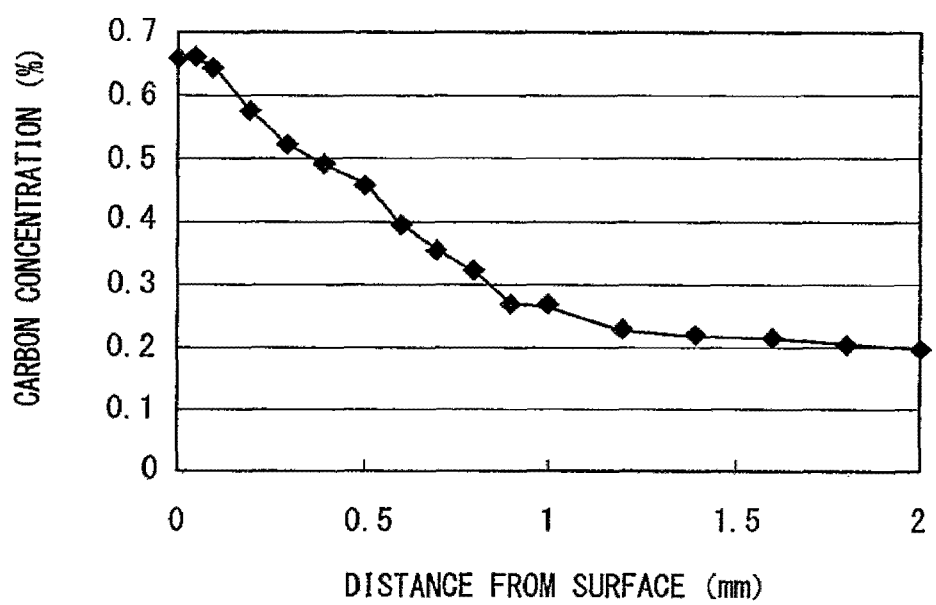
FIG. 4 is a graph showing a relationship between a carbon concentration and a distance from a surface of a carburized steel material.

The heat treatment method according to this exemplary embodiment can also be used for a steel material on which a carburizing treatment is performed. The term "carburizing treatment" used herein refers to a treatment in which carbon is added to harden a surface layer of a steel material. The carbon concentration of the carburized steel material gradually decreases in a direction from the surface of the steel material to the inside thereof. FIG. 4 is a graph showing a relationship between a carbon concentration and a distance from the surface of the carburized steel material. As shown in FIG. 4, in the carburized steel material (hereinafter referred to as the "carburized material"), the carbon concentration gradually decreases in a direction from the surface of the steel material to the inside thereof. In the case of the steel material shown in FIG. 4, the carbon concentration on the surface of the steel material is about 0.66%; the carbon concentration at a location with a distance of 0.5 mm from the surface of the steel material is about 0.46%; the carbon concentration at a location with a distance of 1.0 mm from the surface of the steel material is about 0.27%; and the carbon concentration at a location with a distance of 2.0 mm from the surface of the steel material (the carbon concentration corresponds to the carbon concentration of a base material) is about 0.2%.

In the case of forming the carburized material, a carburizing and quenching treatment is performed on the steel material to thereby form martensite. After that, a tempering treatment is performed to increase the toughness of the steel material. Since the carburizing and quenching treatment and the tempering treatment are treatments that are generally carried out, the detailed descriptions thereof are omitted. The heat treatment method according to this exemplary embodiment is carried out on the carburized material thus formed.

Also in the case of performing the heat treatment on the carburized material, austenite is first generated by heating the carburized material to a temperature equal to or higher than the A1 point (first step). After that, the heated carburized material is cooled, while the heated carburized material is kept at a temperature higher than the Ms point, thereby causing the austenite of the carburized material to be transformed into ferrite, pearlite, or bainite (second step).

In the case of the carburized material, the carbon concentration on the surface of the carburized material is high, while the carbon concentration in the carburized material is low. In this case, the hardness of martensite increases as the carbon concentration increases. Accordingly, when martensite is formed on the surface of the carburized material where the carbon concentration is high, the surface of the carburized material hardens, which causes a delayed fracture. For this reason, it is necessary to prevent the formation of martensite on the surface of the carburized material.

In this exemplary embodiment, the carburized material is cooled in the second step, while the carburized material is kept at a temperature higher than the Ms point, thereby preventing the formation of martensite on the surface of the carburized material. This causes the austenite in the vicinity of the surface of the carburized material to be transformed into ferrite, pearlite, or bainite.

Then, after the austenite in the vicinity of the surface of the carburized material is transformed into ferrite, pearlite, or bainite, the carburized material is cooled to a temperature equal to or lower than the Ms point in the third step. At this time, since the temperature within the carburized material is higher than the temperature on the surface of the carburized material, austenite may exist in the carburized material. Accordingly, when the carburized material is cooled to a temperature equal to or lower than the Ms point in the third step, the cooling of the inside of the carburized material proceeds, so that austenite existing in the carburized material may be transformed into martensite. In particular, in the case of using water cooling, it is highly likely that the cooling of the inside of the carburized material proceeds rapidly and austenite existing in the carburized material is transformed into martensite.

However, since the carbon concentration in the carburized material is low, even if martensite is formed, the hardness of martensite is not so high as to cause a delayed fracture. Accordingly, the formation of martensite in the carburized material is acceptable in quality in some cases. Thus, in this exemplary embodiment, at least the austenite in the vicinity of the surface of the carburized material is transformed into ferrite, pearlite, or bainite (at this time, some austenite may remain in the carburized material), and the carburized material is then cooled to a temperature equal to or lower than the Ms point, thereby making it possible to shorten the heat treatment time and improve the productivity of the heat treatment process.

Note that the timing of starting the cooling in the third step is affected by heat inputs (temperature, time) in the first step (heating step), heat dissipation from the surface of the carburized material, heat conduction to the inside of the carburized material, a temperature curve in the second step (control cooling step), and the like. In practice, the heat treatment and confirmation of the quality of the workpiece on which the heat treatment is performed are repeated to adjust the conditions for the heat treatment, thereby making it possible to determine the timing of starting the cooling.

Figure 5:
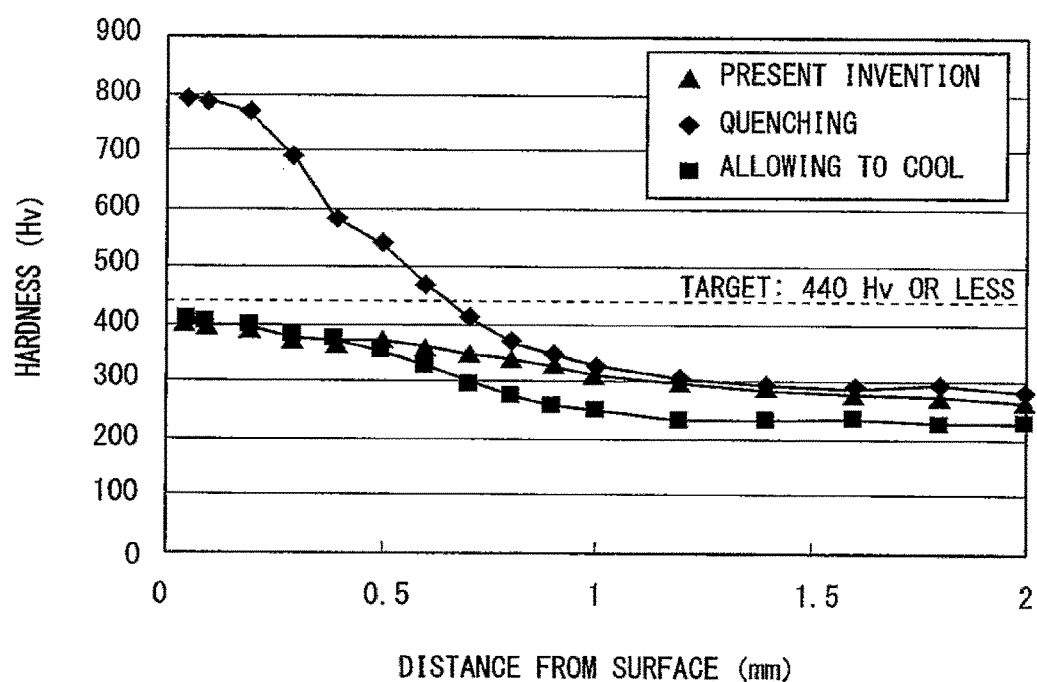
FIG. 5 is a graph showing a relationship between hardness and a distance from a surface of a carburized steel material.

FIG. 5 is a graph showing a relationship between hardness and a distance from a surface of a carburized steel material. As shown in FIG. 5, when the carburized material is heated to a temperature equal to or higher than the A1 point and is then quenched, the hardness of the carburized material in the vicinity of the surface thereof (at a location with a distance of about 0 to 0.6 mm from the surface) is higher than 440 Hv (Vickers hardness). It is considered that this is because austenite has been transformed into martensite due to the quenching process.

On the other hand, in the case of using the heat treatment method according to the present invention, the hardness of the steel material in the vicinity of the surface thereof can be suppressed to 440 Hv or less. Also when the carburized material is allowed to cool after the carburized material is heated to a temperature equal to or higher than the A1 point, the hardness of the material in the vicinity of the surface thereof can be suppressed to 440 Hv or less. Since it takes a long time to allow the material cool, the heat treatment time can be shorted by using the heat treatment method according to the present invention. Even in the case of a quenched sample, the hardness of the inside of the carburized material is less than 440 Hv. It is considered that this is because the carbon concentration in the carburized material is low and thus the hardness of martensite is not increased even when martensite is formed.

The heat treatment method according to this exemplary embodiment can be carried out using an electric furnace, a high-frequency induction heating device, a laser heating device, and the like. Hereinafter, a laser heating device will be described as an example of the heat treatment device for carrying out the heat treatment method according to this exemplary embodiment.

Figure 6:
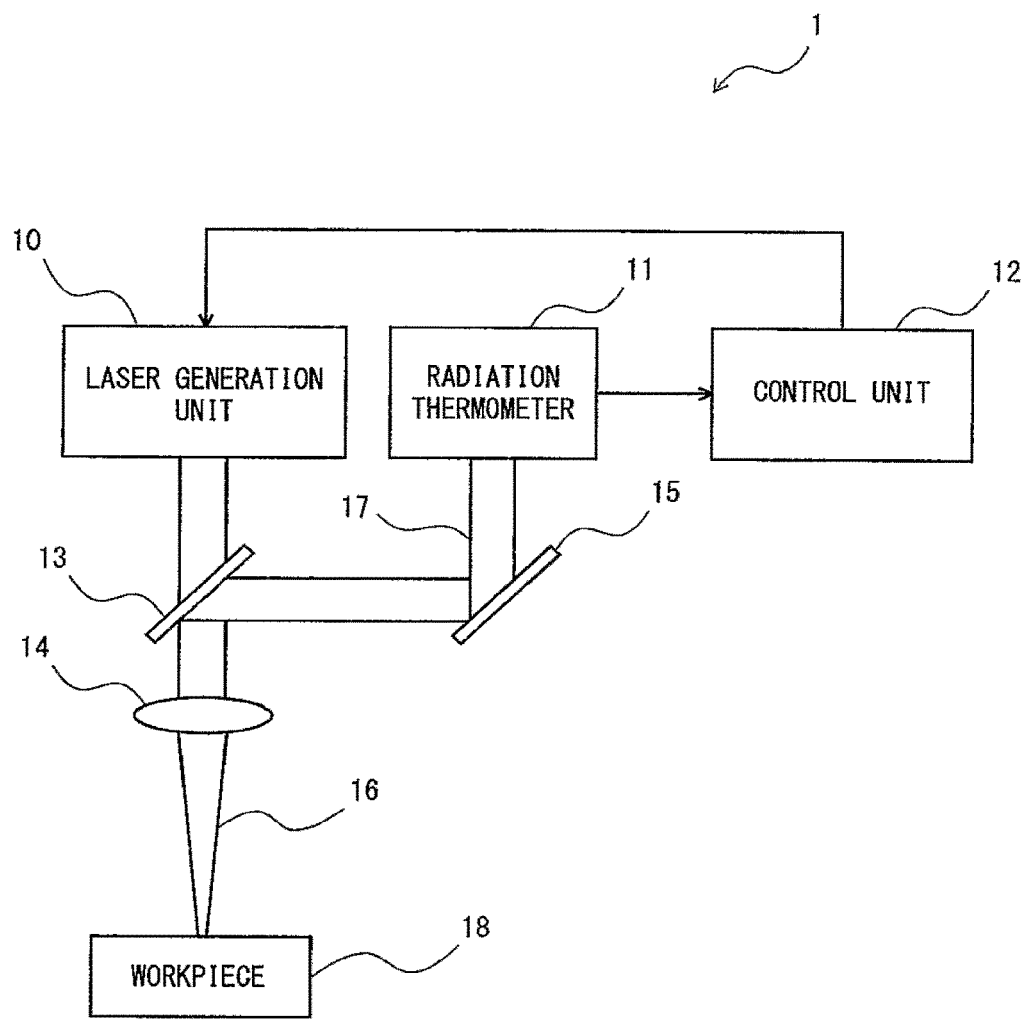
FIG. 6 is a diagram showing an example of a laser heating device.

FIG. 6 is a diagram showing an example of the laser heating device. As shown in FIG. 6, a laser heating device 1 includes a laser generation unit 10, a radiation thermometer 11, a control unit 12, a dichroic mirror 13, a condenser lens 14, and a mirror 15.

The laser generation unit 10 generates laser light as a heat source. The laser light emitted from the laser generation unit 10 is transmitted through the dichroic mirror 13 and is condensed by the condenser lens 14. Laser light 16 condensed by the condenser lens 14 is irradiated on a workpiece 18, thereby heating the workpiece 18. Radiant energy according to the surface temperature of the workpiece 18 is radiated from the heated workpiece 18. The radiant energy radiated from the workpiece 18 is reflected by the dichroic mirror 13 and the mirror 15. The radiant energy 17 reflected by the mirror 15 is incident on the radiation thermometer 11. The radiation thermometer 11 measures the surface temperature of the workpiece 18 by using the incident radiant energy 17. Information about the temperature measured by the radiation thermometer 11 is output to the control unit 12.

The control unit 12 compares a preset temperature with the temperature measured by the radiation thermometer 11 and outputs, to the laser generation unit 10, a control signal according to the comparison result. The laser generation unit 10 adjusts the irradiation energy of the laser light based on the control signal output from the control unit 12. Specifically, when the surface temperature of the workpiece 18 is lower than the preset temperature, the laser generation unit 10 increases the irradiation energy of the laser light. On the other hand, when the surface temperature of the workpiece 18 is higher than the preset temperature, the laser generation unit 10 reduces the irradiation energy of the laser light.

There are two types of laser light intensity distributions: a Gaussian distribution and a top-hat distribution. In the Gaussian distribution, the laser intensity is high at the center of the distribution and decreases in a direction away from the center of the distribution. In the top-hat distribution, the laser intensity can provide uniform irradiation energy to the entire area of a part to be irradiated with laser, unlike in the Gaussian distribution. Accordingly, in the heat treatment method according to this exemplary embodiment, it is preferable to use the laser light having a top-hat distribution with which a uniform temperature distribution can be easily formed on the heated surface of the workpiece 18.

Figure 7:
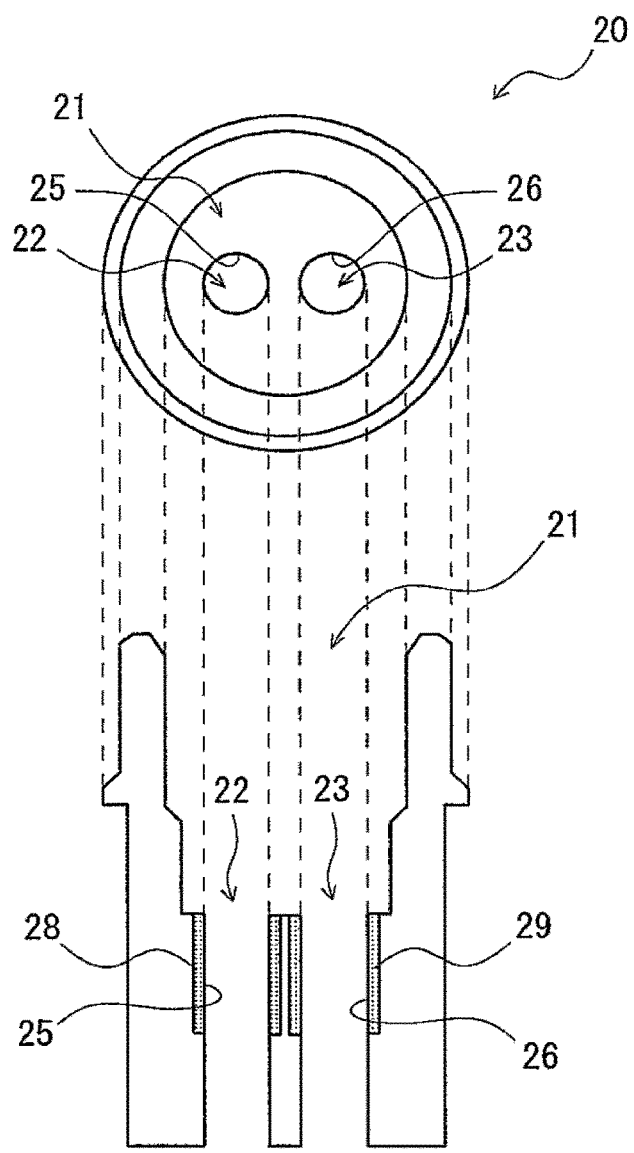
FIG. 7 is a diagram showing an example of a workpiece.

FIG. 7 is a diagram showing an example of the workpiece on which the heat treatment method according to this exemplary embodiment is carried out. In FIG. 7, the upper part shows a top view of the workpiece and the lower part shows a sectional view of the workpiece. A workpiece 20 is formed using a carburized steel material.

As shown in FIG. 7, the workpiece 20 includes a recess 21. Through-holes 22 and 23 are formed in a bottom portion of the recess 21. After the heat treatment, balls (not shown) for sealing the through-holes 22 and 23 are respectively press-fit into the through-holes 22 and 23 of the workpiece 20. At this time, the balls are respectively brought into contact with side surfaces 25 and 26 of the through-holes 22 and 23 of the workpiece 20.

In this case, if a large amount of martensite exists on the side surfaces 25 and 26 of the through-holes 22 and 23 of the workpiece 20, the side surfaces 25 and 26 become hard and fragile. This may cause destruction of the workpiece 20 during the process of press-fitting the balls into the through-holes 22 and 23, respectively. In particular, when the workpiece 20 is formed using a carburized steel material, the carbon concentration on the surface of the steel material is high, and thus martensite formed on the surface of the steel material tends to harden. For this reason, it is necessary to perform the heat treatment on the side surfaces 25 and 26 of the through-holes 22 and 23 shown in FIG. 7, to thereby cause martensite to decrease (or disappear).

In this exemplary embodiment, the laser heating device 1 is used to perform the heat treatment on the side surfaces 25 and 26 of the through-holes 22 and 23 of the workpiece 20, to thereby cause martensite in areas 28 and 29 of the workpiece 20 (areas in the vicinity of the surface of the workpiece) to decrease (or disappear) (see FIG. 7). By performing the heat treatment in this manner, an increase in the hardness of the areas 28 and 29 of the workpiece 20 can be suppressed, and destruction of the workpiece 20 can be prevented when the balls are press-fit into the through-holes 22 and 23, respectively. Note that in this exemplary embodiment, a ball may be press-fit into only one of the through-hole 22 and the through-hole 23. In this case, the heat treatment may be performed only on the through-hole in which the ball is press-fit.

Figure 8:
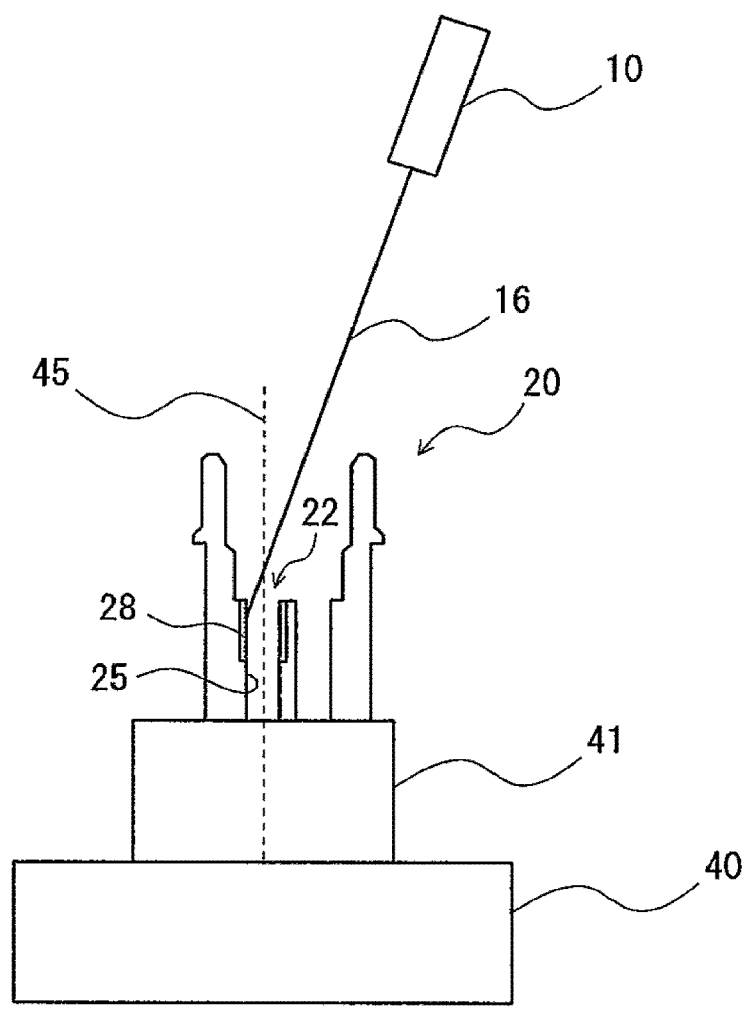
FIG. 8 is a diagram showing an example of a case where a heat treatment is performed on the workpiece by the laser heating device.

For example, when the heat treatment is performed on the side surface 25 of the through-hole 22 of the workpiece 20 by using the laser heating device 1, the workpiece 20 is fixed to a jig 41 as shown in FIG. 8. Further, the jig 41 is mounted on a rotating device 40 and the workpiece 20 is rotated about a center axis 45 of the through-hole 22 of the workpiece 20. While the workpiece 20 is rotated, the laser light 16 is applied onto the side surface 25 of the through-hole 22 from an oblique direction, so that the side surface 25 of the through-hole 22 can be heated. Thus, the heat treatment can be performed on the area 28 of the through-hole 22 of the workpiece 20. Note that in FIG. 8, the illustration of components other than the laser generation unit 10 of the laser heating device 1 is omitted.

In the case of performing the heat treatment, the area 28 of the through-hole 22 is first irradiated with the laser light 16, and the area 28 is heated to a temperature equal to or higher than the A1 point. By heating the area 28 to a temperature equal to or higher than the A1 point, austenite can be formed in the area 28.

After that, the area 28 of the through-hole 22 is cooled while the area 28 is kept at a temperature higher than the Ms point, thereby causing the austenite in the area 28 (in the vicinity of the surface thereof) to be transformed into ferrite, pearlite, or bainite. At this time, the surface temperature of the area 28 is measured, and the area 28 is irradiated with the laser light 16 while the irradiation energy of the laser light 16 is adjusted so that the measured surface temperature of the area 28 is kept at a temperature higher than the Ms point.

After the austenite in the area 28 is transformed into ferrite, pearlite, or bainite, the area 28 is cooled to a temperature equal to or lower than the Ms point. For example, the area 28 may be slowly cooled by stopping the irradiation of the laser light 16, or the area 28 may be quenched by water cooling. When water cooling is used, the cooling rate can be increased, which leads to an improvement in the productivity of the heat treatment process.

When water cooling is used, an internal area (an area deeper than the area 28) of the workpiece 20 is rapidly cooled. Accordingly, if austenite remains in the internal area (the area deeper than the area 28), the residual austenite is transformed into martensite. However, the carbon concentration in the internal area of the carburized workpiece 20 is lower than the carbon concentration on the surface (area 28) thereof. Accordingly, even if martensite is formed in the internal area of the workpiece, the hardness of the martensite formed in the internal area of the workpiece is not greater than the hardness of the martensite formed on the surface thereof. Thus, the formation of martensite in the internal area (the area deeper than the area 28) of the workpiece 20 is acceptable in quality in some cases.

The use of the laser light as described above enables a local heat treatment of narrow areas such as the through-holes 22 and 23 of the workpiece 20.

Note that in this exemplary embodiment, a high-frequency induction heating device may be used as a heat source. However, many high-frequency induction heating devices have a configuration in which a core is attached to a coil of a heat source, and thus chipping or detachment of the core may occur. Accordingly, it is necessary for an operator to visually observe the chipping or detachment of the core. For example, if the operator overlooks the detachment of the core, a defective product may be produced.

Meanwhile, the use of the laser heating device as a heat source is advantageous in that the malfunction caused by the core does not occur, which leads to an improvement in the maintenance of the device.

The invention according to the exemplary embodiments described above can provide a heat treatment method for a steel material which is capable of shortening a heat treatment time while suppressing the formation of martensite.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for manufacturing a workpiece of steel comprising a through-hole, comprising:
   performing a heat treatment by irradiating a side surface of the through-hole with a laser light; and
   press-fitting a ball into the through-hole;
   wherein performing the heat treatment comprises:
   irradiating the side surface of the through-hole with the laser light and heating the side surface of the through-hole to a temperature equal to or higher than an A1 point to form austenite;
   cooling the heated side surface of the through-hole, while keeping the side surface of the through-hole at a temperature higher than an Ms point, thereby causing the austenite of the side surface of the through-hole to be transformed into ferrite, pearlite, or bainite; and
   cooling the side surface of the through-hole to a temperature equal to or lower than the Ms point; and
   when the ball is press-fit into the through-hole, the ball is brought into contact with an area of the side surface of the through-hole on which the heat treatment has been performed.

2. The method for manufacturing a workpiece of steel comprising a through-hole according to claim 1, wherein
   the side surface of the through-hole is carburized so that a carbon concentration gradually decreases in a direction from a surface of the side surface of the through-hole to an inside thereof,
   the side surface of the through-hole is cooled while a surface temperature of the side surface of the through-hole is kept at a temperature higher than the Ms point, thereby causing austenite in the vicinity of the surface of the side surface of the through-hole to be transformed into ferrite, pearlite, or bainite, and
   after the transformation of at least the austenite in the vicinity of the surface of the side surface of the through-hole into ferrite, pearlite, or bainite, the side surface of the through-hole is cooled to a temperature equal to or lower than the Ms point.

3. The method for manufacturing a workpiece of steel comprising a through-hole according to claim 1, wherein when the steel material is cooled to a temperature equal to or lower than the Ms point in the third step, water cooling is used to cool the side surface of the through-hole.

4. The method for manufacturing a workpiece of steel comprising a through-hole according to claim 1, wherein when the side surface of the through-hole is cooled at a temperature higher than an Ms point,
   a surface temperature of the side surface of the through-hole is measured, and the side surface of the through-hole is irradiated with the laser light while an irradiation energy of the laser light is adjusted in such a manner that the measured surface temperature of the side surface of the through-hole is kept at a temperature higher than the Ms point.

* * * * *